US012718692B2

(12) United States Patent
Kim

(10) Patent No.: US 12,718,692 B2
(45) Date of Patent: Aug. 25, 2026

(54) LANE CHANGE RECOMMENDATION SYSTEM AND METHOD

(71) Applicant: HL KLEMOVE CORP., Incheon (KR)

(72) Inventor: Jae Hwan Kim, Seoul (KR)

(73) Assignee: HL KLEMOVE CORP., Incheon (KR)

( * ) Notice: Subject to any disclaimer, the term of this patent is extended or adjusted under 35 U.S.C. 154(b) by 163 days.

(21) Appl. No.: 18/232,357

(22) Filed: Aug. 10, 2023

(65) Prior Publication Data

US 2024/0144829 A1 May 2, 2024

(30) Foreign Application Priority Data

Nov. 1, 2022 (KR) ........................ 10-2022-0143501

(51) Int. Cl.
*G08G 1/16* (2006.01)
*B60W 30/18* (2012.01)

(52) U.S. Cl.
CPC ....... *G08G 1/167* (2013.01); *B60W 30/18163* (2013.01); *B60W 2520/10* (2013.01); *B60W 2520/105* (2013.01); *B60W 2540/215* (2020.02); *B60W 2552/05* (2020.02); *B60W 2552/10* (2020.02); *B60W 2554/402* (2020.02); *B60W 2554/4042* (2020.02); *B60W 2554/802* (2020.02); *B60W 2554/804* (2020.02); *B60W 2720/106* (2013.01)

(58) Field of Classification Search
CPC ............ G08G 1/167; B60W 30/18163; B60W 2520/10; B60W 2520/105; B60W 2540/215; B60W 2552/05; B60W 2552/10; B60W 2554/402; B60W 2554/4042; B60W 2554/802; B60W 2554/804; B60W 2720/106; B60W 40/06; B60W 40/10; B60W 2050/0005; G06F 18/2411; G01C 21/20; G01C 21/28; G01C 21/3415; G06N 20/10; G06N 20/00
See application file for complete search history.

(56) References Cited

U.S. PATENT DOCUMENTS 10,889,298 B2 * 1/2021 Hayashi ................ G08G 1/167
12,131,599 B1 * 10/2024 Shah ........................ G07C 5/10
2010/0134265 A1 * 6/2010 Lin ........................ G06T 7/80 348/148
2010/0274473 A1 * 10/2010 Konishi ............ G01C 21/3697 701/532
2016/0314358 A1 * 10/2016 Kushida ............... B60W 30/12
2017/0076605 A1 * 3/2017 Suzuki .................. G08G 1/133
2017/0113673 A1 * 4/2017 Kokido ................ B60W 30/10
(Continued)

*Primary Examiner* — Ashley L Redhead, Jr.
(74) *Attorney, Agent, or Firm* — WOMBLE BOND DICKINSON (US) LLP

(57) ABSTRACT

A lane change recommendation system may include: a lane recommendation condition determination unit including a driving situation determination unit determining whether a host vehicle being driven on a driving lane satisfies driving situation conditions for lane change from the driving lane to a target lane; and a lane determination unit determining whether a lane condition for the lane change is satisfied based on a color and type of a lane between the driving lane and the target lane; and a status transition unit receiving a status indicating whether the lane change is possible from the lane recommendation condition determination unit to generate an instruction of lane recommendation.

11 Claims, 7 Drawing Sheets

(56) References Cited

U.S. PATENT DOCUMENTS

| | | | | |
|---|---|---|---|---|
| 2017/0151982 | A1* | 6/2017 | Fujii | G06V 20/588 |
| 2018/0170384 | A1* | 6/2018 | Masui | B60W 30/165 |
| 2019/0315358 | A1* | 10/2019 | Kim | B60W 50/082 |
| 2020/0117916 | A1* | 4/2020 | Liu | G06V 10/764 |
| 2020/0180635 | A1* | 6/2020 | Hong | B62D 15/024 |
| 2020/0189582 | A1* | 6/2020 | Fukushige | B60W 30/10 |
| 2020/0361477 | A1* | 11/2020 | Ha | B60W 50/00 |
| 2021/0046936 | A1* | 2/2021 | Umeda | B60W 10/20 |
| 2021/0107487 | A1* | 4/2021 | Oh | B60W 30/09 |
| 2021/0114604 | A1* | 4/2021 | Nagaraja | G06N 3/044 |
| 2022/0292849 | A1* | 9/2022 | Zhou | B60W 60/001 |

* cited by examiner

LANE CHANGE RECOMMENDATION SYSTEM AND METHOD

CROSS-REFERENCE TO RELATED APPLICATION

This application claims priority under 35 U.S.C. § 119 to Korean Patent Application No. 10-2022-0143501, filed on Nov. 1, 2022, in the Korean Intellectual Property Office (KIPO), the disclosure of which is incorporated by reference herein in its entirety.

TECHNICAL FIELD

The present disclosure generally relates to a system and a method for lane change recommendation, and more particularly, to a system and a method for lane change recommendation for improving a driving speed in consideration of a setting speed set by a driver or operator.

BACKGROUND

Recently, development of autonomous driving technology that a vehicle automatically drives on its own without driving the vehicle directly by a driver has been developed. For example, if the driver sets a speed the vehicle, the vehicle can drive on its own to maintain the speed set by the driver. In another example, the vehicle can obtain surrounding image information by using sensors such as a camera, a Lidar, and a radar, and change a lane by using the obtained surrounding image information.

On the other hand, if an autonomous vehicle changes the lane by just using the surrounding image information only, an accident can occur due to unexpected things such as atypical obstacles or it is difficult to normally change the lane. Further, when a low-speed vehicle approaches ahead, it is difficult for the vehicle to maintain the speed of the vehicle set by the driver.

SUMMARY

In order to solve the problem, the present disclosure has been made in an effort to provide a lane change recommendation method, a non-transitory computer readable medium storing instructions, and a lane change recommendation system (or apparatus).

The present disclosure may be implemented by various schemes including a method, a system (or an apparatus), and a non-transitory computer-readable medium.

An exemplary embodiment of the present disclosure provides a lane change recommendation system which includes: a lane recommendation condition determination unit including a driving situation determination unit determining whether a vehicle being driven on a driving lane satisfies a plurality of driving situation conditions for lane change onto a target lane; and a lane determination unit determining whether a lane condition for the lane change is satisfied based on a color and a type of a lane between the driving lane and the target lane; and a status transition unit receiving a status indicating whether the lane change is possible from the lane recommendation condition determination unit to generate a lane recommendation instruction.

According to an exemplary embodiment of the present disclosure, the driving situation determination unit determines whether at least some conditions among the plurality of driving situation conditions are satisfied by using at least some of a relative speed of a front vehicle of the front on the driving lane, a vehicle type of the front vehicle, and a difference between a measured relative distance of the front vehicle and an target inter-vehicle distance set by the driver.

According to an exemplary embodiment of the present disclosure, the driving situation determination unit determines whether at least some conditions among the plurality of driving situation conditions are satisfied by using at least some of a measured relative distance to a side front vehicle and a measured relative distance to a side rear vehicle on a target lane.

According to an exemplary embodiment of the present disclosure, the lane change recommendation system is associated with a driver switch input unit providing a setting speed of the vehicle input by a driver. The driving situation determination unit determines whether at least some conditions of the plurality of driving situation conditions are satisfied by using a difference between the setting speed of the vehicle and an actual driving speed of the vehicle.

According to an exemplary embodiment of the present disclosure, the lane determination unit determines whether the lane condition is satisfied based on a color and a type of a lane between the driving lane and the target lane.

According to an exemplary embodiment of the present disclosure, the lane change recommendation system further includes a lane change prediction determination unit determining whether the vehicle satisfies a first lane change recommendation condition based on a relevancy between the vehicle and surrounding vehicles on the driving lane and the target lane by using a learned machine learning model.

According to an exemplary embodiment of the present disclosure, the machine learning model is a support vector machine (SVM) model learned to classify data of a situation of changing the lane and data in a situation of not changing the lane.

According to an exemplary embodiment of the present disclosure, the lane change recommendation system further includes an acceleration gain determination unit determining whether the vehicle satisfies a second lane change recommendation condition by calculating acceleration gain values between the vehicle, and the surrounding vehicles on the driving lane and the target lane.

According to an exemplary embodiment of the present disclosure, the acceleration gain determination unit calculates the acceleration gain value by using a predetermined minimizing overall braking induced by lane changes (MOBIL) algorithm.

According to an exemplary embodiment of the present disclosure, the acceleration gain determination unit determines whether the vehicle satisfies the second lane change recommendation condition based on whether the calculated acceleration gain values being equal to or more than a predetermined threshold value.

According to an exemplary embodiment of the present disclosure, the status transition unit determines whether a lane return condition is satisfied based on speeds of vehicles being driven on a passing lane when the driving lane of the vehicle after the lane change is a passing lane.

According to an exemplary embodiment of the present disclosure, the status transition unit generates a lane return instruction when speeds of vehicles being driven on the passing lane are equal to or more than a predetermined speed.

According to an exemplary embodiment of the present disclosure, the lane change recommendation system is associated with a navigation map information module generating road information according to a current location of the vehicle by estimating the current location of the vehicle.

According to an exemplary embodiment of the present disclosure, the lane change recommendation system is associated with a driving lane determination module generating current driving lane information of the vehicle.

According to an exemplary embodiment of the present disclosure, the lane change recommendation system is associated with a sensor fusion information input unit providing sensor data acquired by at least one sensor.

According to an exemplary embodiment of the present disclosure, the lane change recommendation system operates the lane recommendation condition determination unit in response to determining that the vehicle is disabled to be driven at a speed around a setting speed of the driver.

Another exemplary embodiment of the present disclosure provides a lane change recommendation method performed by at least one processor, which includes: determining whether a vehicle being driven on a driving lane satisfies a plurality of driving situation conditions for lane change onto a target lane; determining whether a lane condition for lane change is satisfied based on a color and a type of a lane between the driving lane and the target lane; determining whether the vehicle satisfies a first lane change recommendation condition based on a relevancy between the vehicle and surrounding vehicles on the driving lane and the target lane by using a learned machine learning model; determining whether the vehicle satisfies a second lane change recommendation condition by calculating acceleration gain values between the vehicle, and the surrounding vehicles on the driving lane and the target lane; and generating a lane recommendation instruction when the driving situation condition, the lane condition, the first lane change recommendation condition, and the second lane change recommendation condition are satisfied.

According to an exemplary embodiment of the present disclosure, the lane change recommendation method further includes, in response to determining that the vehicle is disabled to be driven at a speed around a setting speed of a driver, determining the driving situation condition, the lane condition, the first lane change recommendation condition, and the second lane change recommendation condition.

According to an exemplary embodiment of the present disclosure, the lane change recommendation method further includes, when the driving lane of the vehicle after the lane change is a passing lane, determining whether a lane return condition is satisfied based on speeds of vehicles being driven on the passing lane.

Yet another exemplary embodiment of the present disclosure provides a non-transitory computer-readable recording medium storing instructions for execution by one or more processors that, when executed by the one or more processors, cause the one or more processors to perform the method.

According to various exemplary embodiments of the present disclosure, when a plurality of driving situation conditions, lane conditions, first lane change condition, and a second lane change condition are all satisfied, the lane change can be stably recommended, and autonomous driving control can be performed to follow a setting speed set by a driver and quickly process computerized instructions for the lane change.

According to various exemplary embodiments of the present disclosure, a lane change recommendation system appropriately decides a lane recommendation status and/or a lane return status thereby precise instructions related to operations of lane change, lane recommendation and lane return, and provide the lane recommendation status and/or lane return status to the driver or perform vehicle control in order to stably maintain a speed of the vehicle through an interaction of a lane recommendation condition determination unit and a status transition unit.

According to various exemplary embodiments of the present disclosure, the vehicle can recommend the lane change by comprehensively considering an overall traffic flow of a road in addition to a physical lane change possibility with less computation resources, and as a result, there is an advantage in that a gain can be obtained in the traffic flow.

According to various exemplary embodiments of the present disclosure, the vehicle can recommend the lane change only in an environment similar to an environment in which a person actually changes the lane, so stable lane change recommendation can be performed while lowering an accident possibility according to the lane change.

According to various exemplary embodiments of the present disclosure, the lane change recommendation system, as an autonomous driving system, can determine whether to change lanes i) by evaluating rule-based lane-changing conditions based on data collected through various sensors such as camera sensors, lidar sensors, etc., ii) by calculating acceleration gain values, and iii) by classifying data using a support vector machine (SVM) model.

Effects of the present disclosure are not limited to the aforementioned effects and other unmentioned effects will be clearly understood by those having a common knowledge in a technical field to which the present disclosure pertains (hereinafter, referred to as "those skilled in the art") from the disclosure of the claims.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Exemplary embodiments of the present disclosure will be described below with reference to the accompanying drawings, and here, similar reference numerals represent similar elements, but the present disclosure is not limited thereto.

DETAILED DESCRIPTION

Figure 1:
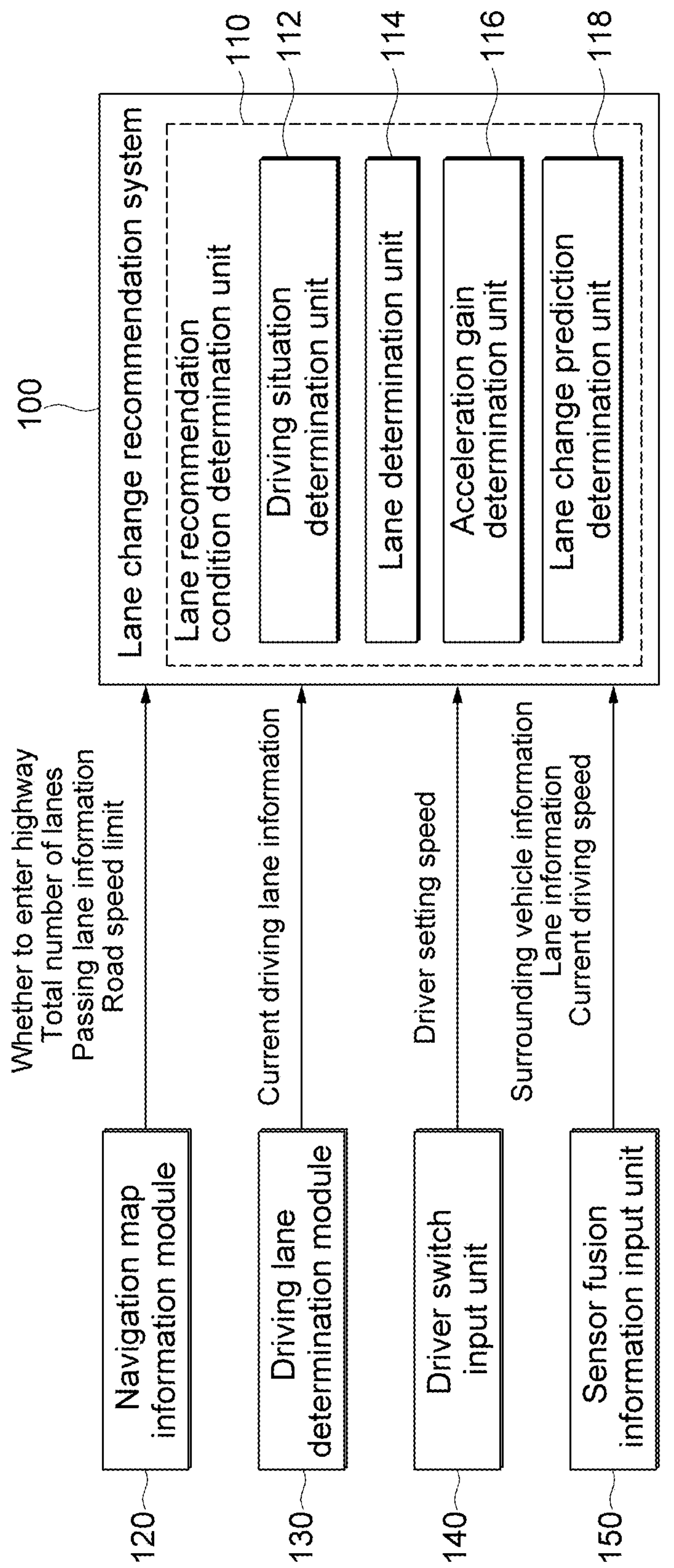
FIG. 1 is a functional block diagram for illustrating an internal configuration of a lane change recommendation system according to an exemplary embodiment of the present disclosure.

In the following detailed description, reference is made to the accompanying drawing, which forms a part hereof. The illustrative embodiments described in the detailed description, drawing, and claims are not meant to be limiting. Other embodiments may be utilized, and other changes may be made, without departing from the spirit or scope of the subject matter presented here.

Hereinafter, specific contents for carrying out the present disclosure will be described in detail with reference to the accompanying drawings. However, in the following description, if the gist of the present disclosure may be unnecessarily obscure, the specific description of the well-known functions or configurations will be omitted.

In the accompanying drawings, the same or corresponding component is represented by the same reference numeral. Further, in describing the following exemplary embodiments, redundantly describing the same or corresponding component may be omitted. However, even though the description of the component is omitted, it is not intended that such a component is not included in any exemplary embodiment.

Advantages and features of the disclosed exemplary embodiment of the present disclosure, and methods for accomplishing the same will be more clearly understood from embodiments described below with reference to the accompanying drawings. However, the present disclosure is not limited to an exemplary embodiment disclosed below but may be implemented in various different shapes and the exemplary embodiments just complete the present disclosure and is provided to completely inform a scope of the present disclosure to those skilled in the art.

Terms used in the present specification will be described in brief and the disclosed exemplary embodiment will be described in detail. Terms used in the present specification adopt general terms which are currently widely used as possible by considering functions in the present disclosure, but the terms may be changed depending on an intention of those skilled in the art, a precedent, emergence of new technology, etc. Further, in a specific case, a term which an applicant arbitrarily selects is present and in this case, a meaning of the term will be disclosed in detail in a corresponding description part of the invention. Accordingly, a term used in the present disclosure should be defined based on not just a name of the term but a meaning of the term and contents throughout the present disclosure.

A singular expression in the present specification includes a plural expression if there is no clearly singular meaning in the context. Further, the plural expression includes the singular expression if there is no clearly plural meaning in the context. Further, throughout the specification, unless explicitly described to the contrary, the word "comprise" and variations such as "comprises" or "comprising", will be understood to imply the inclusion of stated elements but not the exclusion of any other elements.

In the present disclosure, the terms "include", "including", etc., may indicate that features, steps, operations, elements, and/or components are present, but the terms do not exclude addition of one or more other functions, steps, operations, elements, components, and/or a combination thereof.

In the present disclosure, if a specific component is mentioned as "coupled", "combined", "connected", or "reacted" in any other component, the specific component is directly coupled, combined, and/or connected, or reacted to other components, but not limited to it. For example, one or more intermediate components may be present between the specific component and another component. Further, in the present disclosure, "and/or" may include one or more respective items listed or at least some combinations of one or more items.

In the present disclosure, the terms "first," "second," and the like are used to differentiate one component from other components, but the component is not limited to the term. For example, the "first" component may be the same or similar element as the "second" component.

In the present disclosure, a "driving lane" can be a lane that a vehicle is currently driving, and a "target lane" can be a lane that the vehicle is trying to change, for example, a left or right lane of the vehicle.

In the present disclosure, a "relative distance" may be an actual distance between a front vehicle and a host vehicle measured by one or more sensors and an "inter-vehicle distance set" may be a distance value set by a driver in advance.

In the present disclosure, a "support vector machine (SVM)" may be a machine learning model learned by supervised learning, and may have, for example, but not limited to, a model used for classifying arbitrary data into two groups.

FIG. 1 is a functional block diagram for illustrating an internal configuration of a lane change recommendation system 100 according to an exemplary embodiment of the present disclosure. As illustrated in FIG. 1, the lane change recommendation system 100 as an arbitrary apparatus associated with a vehicle may refer to an apparatus that is capable of communicating with various sensors to acquire, manage, and/or process information related to the vehicle and/or environment around the vehicle, and may include, for example, a lane recommendation condition determination unit 110. Here, the lane recommendation condition determination unit 110 may include, for example, but not limited to, a driving situation determination unit 112, a lane determination unit 114, an acceleration gain determination unit 116, and a lane change prediction determination unit 118.

According to an exemplary embodiment of the present disclosure, the lane change recommendation system 100 may acquire various information or data through a vehicle associated navigation map information module 120, a driving lane determination module 130, a driver switch input nit 140, a sensor fusion information input unit 150, etc. First, the navigation map information module 120 may be a module configured to estimate a current location of the vehicle from a global positioning system (GPS) sensor included in the vehicle. For example, the navigation map information module 120 may generate road information or data according to the current location of the vehicle by estimating the current location of the vehicle by the GPS sensor. The lane change recommendation system 100 may acquire road information or data including whether the vehicle enters a highway, the total number of lanes on roads at which the vehicle is currently positioned or driving, passing lane information, a road limit speed, etc., from the navigation map information module 120.

According to an exemplary embodiment, the driving lane determination module 130 may be a module configured to estimate a driving lane at which the vehicle is currently positioned or driving on a road at which the vehicle is positioned. For example, the driving lane determination module 130 may sense a surrounding of the vehicle or an environment around the vehicle by using various sensors such as a camera sensor, a radar sensor, and a light detection and ranging (LiDAR) sensor, and estimate the driving lane at which the vehicle is currently positioned or driving based on the information or data sensed by various sensor. In this case, the lane change recommendation system 100 may obtain current driving lane information of the vehicle from the driving lane determination module 130.

According to an exemplary embodiment of the present disclosure, the vehicle can communicate with the driver through the driver switch input unit 140, and the driver switch input unit 140 may be configured to receive an input regarding a setting speed of the vehicle from the driver. Here, the setting speed may indicate the driving speed of the vehicle desired by the driver when the vehicle is driven or operated autonomously. For example, if the driver enters the setting speed at 80 km/h, the vehicle may be driven to follow 80 km/h. That is, the lane change recommendation system 100 may receive or acquire data or information on the setting speed of the vehicle through the driver switch input unit 140.

According to an exemplary embodiment of the present disclosure, the sensor fusion information input unit 150 may be configured to fuse sensor data obtained from various sensors such as a torque sensor, an angle sensor, a speed sensor, a camera sensor, a radar sensor, and a LiDAR sensor included in the vehicle to generate surrounding vehicle information, lane information such as a lane type and a lane color, and information on a current driving speed of the vehicle. The lane change recommendation system 100 may acquire the speed of the vehicle, information on a surrounding vehicle, and the lane information from the sensor fusion information input unit 150. The lane change recommendation system 100 may decide whether to recommend the lane change by using the data or information acquired through the navigation map information module 120, the driving lane determination module 130, the driver switch input unit 140, and the sensor fusion information input unit 150.

The driving situation determination unit 112 may determine whether the vehicle being driven on the driving lane satisfies a plurality of driving situation conditions for changing a lane from the driving lane to a target lane. For example, the driving situation determination unit 112 may pre-define or pre-set and store a plurality of rule-based driving situations conditions and determine whether the vehicle satisfies the plurality of driving situation conditions based on the various collected information or data described above.

According to an exemplary embodiment of the present disclosure, the driving situation determination unit 112 may determine whether by one or more conditions of the plurality of driving situation conditions are satisfied by using, for instance, but not limited to, (1) a relative speed of the host vehicle with respect to a front vehicle in the driving lane (or a relative speed of the front vehicle with respect to the host vehicle), (2) a vehicle type of the front vehicle, (3) a difference between a measured relative distance between the host vehicle and the front vehicle and an target inter-vehicle distance set by the driver, (4) a measured relative distance between the host vehicle and a side front vehicle, and (5) a measured relative distance between the host vehicle and a side rear vehicle. For example, when the relative speed between the vehicle and the front vehicle is equal to or less than a predetermined speed or when a difference between the measured relative distance and the target inter-vehicle distance set by the driver is equal to or less than a predetermined reference, the front vehicle is determined or categorized as a special vehicle such a school bus, an emergency vehicle, etc., and when the measured relative distance of the host vehicle with respect to the side vehicle is equal to or less than a predetermined distance, the driving situation determination unit 112 may determine that the lane change is impossible because one of the driving situation conditions is not satisfied.

Additionally, the driving situation determination unit 112 may receive the setting speed of the vehicle, and determine whether one or more conditions of the plurality of driving situation conditions are satisfied by using (6) a difference between the setting speed of the host vehicle and an actual driving speed of the host vehicle. For example, when a difference between the setting speed input by the driver and the actual driving speed of the host vehicle is equal to or more than a predetermined reference, the driving situation determination unit 112 may determine that one of the driving situation conditions is satisfied.

Additionally, the lane determination unit 114 may determine whether a lane condition for the lane change is satisfied based on (7) a color and a type of a lane between the driving lane and the target lane. For example, when the lane between the driving lane and the target lane is a lane in which the lane change is prohibited or is not allowed, such as a solid line, a yellow, or a blue, the lane determination unit 114 may determine that the lane change is impossible because the lane condition is not satisfied.

According to an exemplary embodiment of the present disclosure, the acceleration gain determination unit 116 calculates an acceleration gain value between the host vehicle and surrounding vehicles on the driving lane and the target lane to determine whether the host vehicle satisfies the lane change recommendation condition (e.g., second lane change recommendation condition). For example, the acceleration gain determination unit 116 may calculate an acceleration gain value between the host vehicle, the rear vehicle on the driving lane, and the side rear vehicle on the target lane. Here, the acceleration gain value may indicate a value by adding differences between current accelerations of the host vehicle and other vehicles (e.g. the rear vehicle and the side rear vehicle), and anticipated accelerations after the possible vehicle changes the lane. That is, the acceleration gain value may be a value indicating a gain on an overall traffic flow according to the change of the lane by the host vehicle.

The acceleration gain determination unit 116 may calculate the acceleration gain value by using a predetermined minimizing overall braking induced by lane changes (MOBIL) algorithm. Here, the MOBIL algorithm may refer to an algorithm that is capable of determining whether to change the lane based on the acceleration gain between the driving lane and the target lane in which the lane change is anticipated. The acceleration gain determination unit 116 may determine whether the vehicle satisfies a lane changer recommendation condition based on whether the calculated acceleration gain value is equal to or greater than a predetermined threshold value.

According to an exemplary embodiment of the present disclosure, the lane change prediction determination unit 118 may determine whether the vehicle satisfies a lane change recommendation condition (e.g., a first lane change recommendation condition) based on a relevancy between the host vehicle, and the surrounding vehicles on the driving lane and the target lane by using a learned machine learning model. For instance, the lane change prediction determination unit 118 may determine whether the host vehicle satisfies a lane change recommendation condition based on the relevancies between the host vehicle and the front vehicle on the driving lane, and the side rear vehicle on the target lane and the side front vehicle on the target lane. Here, the machine learning model may be, for example, but not limited to, a support vector machine (SVM) model learned to classify data of a possible situation of changing the lane and data in a possible situation of not changing the lane. Further, the relevancy may indicate a measured relative distance and/or a relative speed between the host vehicle and the other vehicles (e.g. the front vehicle, the side rear vehicle, and the side front vehicle). That is, the machine learning model may be learned to classify the measured relative distance and/or the relative speed of the host vehicle with respect to other vehicles when a vehicle driver performs the lane change and the measured relative distance and/or the relative speed of the host vehicle with respect to other vehicles when the driver does not perform the lane change in order to predict the possible situation in which the driver changes the lane.

According to an exemplary embodiment of the present disclosure, the lane change recommendation system 100 may recommend the lane change when the driving situation condition, the lane condition, the first lane change recommendation condition, and the second lane change recommendation condition are satisfied. Specifically, the lane change recommendation system 100 can output a notification, indication or signal indicating the recommendation of the lane change. For example, the lane change recommendation system 100 may recommend the lane change to the driver through a display, an interface, a light, and a sound of the vehicle. In another example, the lane change recommendation system 100 may also automatically perform the lane change by directly manipulating the vehicle by a controller.

According to an exemplary embodiment of the present disclosure, the lane change recommendation system 100 may receive the setting speed of the host vehicle, and determine whether the host vehicle is enabled to be driven at a speed around the setting speed on the driving lane. Further, the lane change recommendation system 100 may determine whether the plurality of driving situation conditions, the lane condition, the first lane change condition, and the second lane change condition are satisfied in response to determining that the vehicle is unable to be driven at a speed around the setting speed (e.g., a speed within a predetermined reference from the setting speed). For example, when a low-speed vehicle approaches from a long distance or the vehicle cannot be driven at the speed around the setting speed by following the low-speed vehicle at a constant speed, the lane change recommendation system 100 may recommend the lane change.

Further, in FIG. 1, respective functional components included in the lane change recommendation system 100 are separately described, but this is just for assisting the understanding of the present disclosure, and one operation device or one functional component may also perform multiple functions of the plurality of components of FIG. 1. In FIG. 1, an operation of changing the lane is described above, but a scheme similar to the above-described scheme may be used even in an operation of returning to the lane. By such a configuration, when the plurality of driving situation conditions, the lane condition, the first lane change condition, and the second lane change condition are all satisfied, the lane change can be stably recommended, and autonomous driving control can be performed to follow the setting speed set by the driver.

Figure 2:
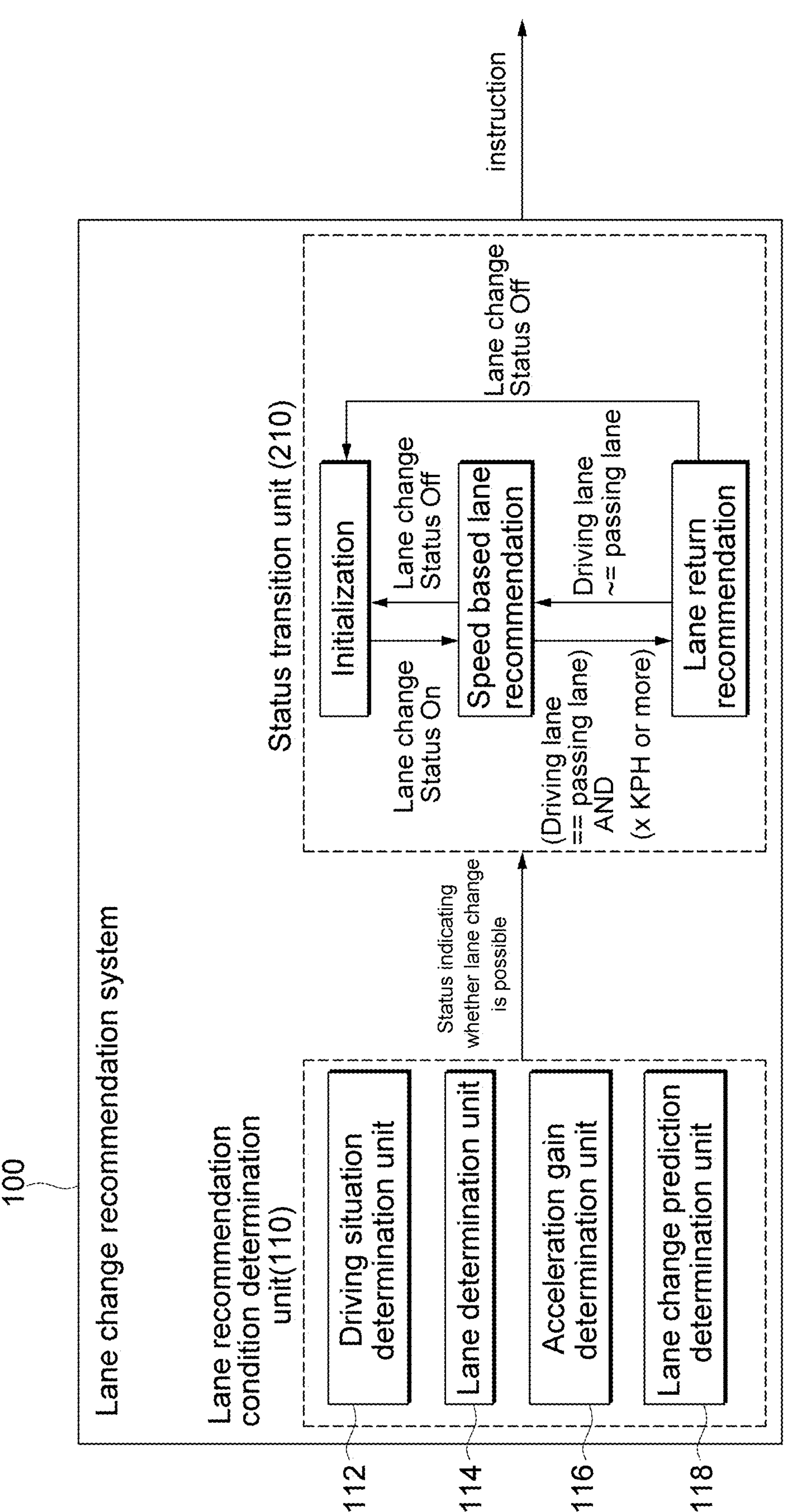
FIG. 2 is a functional block diagram for illustrating an additional internal configuration of a lane change recommendation system according to an exemplary embodiment of the present disclosure.

FIG. 2 is a functional block diagram for illustrating an additional internal configuration of the lane change recommendation system 100 according to an exemplary embodiment of the present disclosure. As illustrated in FIG. 2, the lane change recommendation system 100 may further include a status transition unit 210 jointly with the lane recommendation condition determination unit 110. Here, the status transition unit 210 may refer to an optional module configured to decide lane recommendation and/or lane return based on information received from the lane recommendation condition determination unit 110.

As described above, the lane recommendation condition determination unit 110 may determine whether the host vehicle satisfies the plurality of driving situation conditions, the lane condition, the first lane change recommendation condition, and/or the second lane change recommendation condition. For example, the lane recommendation condition determination unit 110 may determine whether the host vehicle satisfies the plurality of driving situation conditions, the lane condition, the first lane change recommendation condition, and the second lane change recommendation condition, and provide a status indicating whether the lane change from the driving lane to the target lane is possible (e.g. whether the host vehicle can change the lane from the driving lane to the target lane) to the status transition unit 210.

The status transition unit 210 receives the status indicating whether the lane change from the driving lane to the target lane is possible from the lane recommendation condition determination unit 110 to generate an instruction of lane recommendation. For example, when the status transition unit 210, which is in an initial state, receives a status indicating that the lane change from the driving lane to the target lane is possible from the lane recommendation condition determination unit 110, the status transition unit 210 may on-control the lane change status and change the lane change status from the initial state to a speed based lane recommendation status. In the speed based lane recommendation status, the status transition unit 210 may generate the instruction of lane recommendation. However, when the status transition unit 210, which is in an initial state, receives a status indicating that the lane change is impossible or is not allowed from the lane recommendation condition determination unit 110, the status transition unit 210 may OFF-control the lane change status and maintain the initial status or return the lane change status to the initial status.

Additionally or alternatively, if speeds of other vehicles which are being driven on the passing lane are equal to or greater than a predetermined speed (e.g., 100 KPH) when the vehicle is changing the lane and is positioned on a passing lane by an instruction of lane recommendation such as an instruction of recommending the lane change, the status transition unit 210 may change the lane change status to a lane return recommendation status such as a status of recommending lane return. In this case, the status transition unit 210 may generate an instruction for lane return. When receiving the status indicating that the lane change is impossible or is not allowed or recommended in the lane return recommendation status, the status transition unit 210 may change the lane change status to the initial status. By such a configuration, the lane change recommendation system 100 appropriately decides the lane recommendation status and/or the lane return status, and provide the lane recommendation status and/or lane return status to the driver or operator, or perform control of the vehicle in order to stably maintain the speed of the vehicle through the interaction between the lane recommendation condition determination unit 110 and the status transition unit 210.

Figure 3:
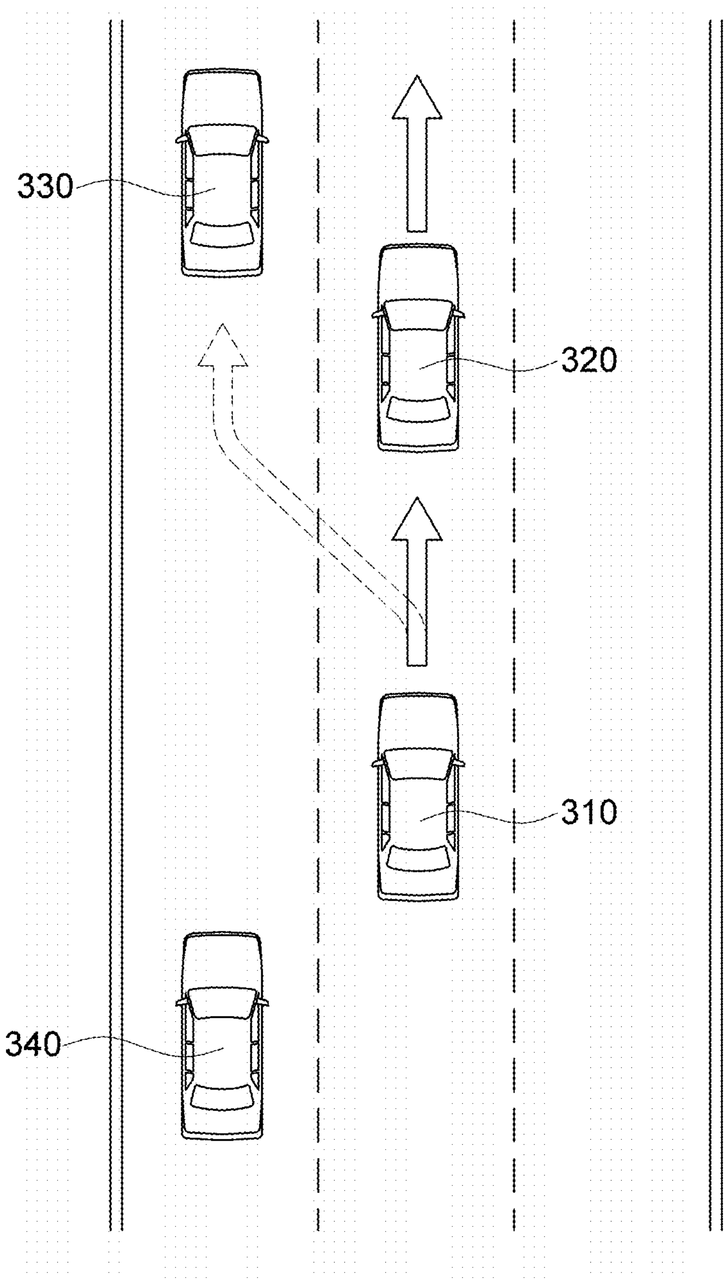
FIG. 3 is a conceptual diagram for illustrating an example of determining whether a vehicle satisfies a plurality of driving situation conditions and/or lane conditions according to an exemplary embodiment of the present disclosure.

FIG. 3 is a conceptual diagram illustrating an example of determining whether a vehicle 310 satisfies a plurality of driving situation conditions and/or lane conditions according to an exemplary embodiment of the present disclosure. In the example illustrated in FIG. 3, the vehicle 310 may be driven on the driving lane, and determine whether the plurality of driving situation conditions and/or the lane condition are/is satisfied in order to determine whether the lane change from the driving lane to the target lane (e.g., a passing lane) is possible.

According to an exemplary embodiment, the vehicle 310 (and/or a lane change recommendation system, such as the lane change recommendation system 100 of FIGS. 1 and 2, associated with the vehicle 310) may determine whether one or more conditions of the plurality of driving situation conditions are satisfied based on a relative speed of the host vehicle 310 with respect to a front vehicle 320 on the driving lane (or a relative speed of the front vehicle 320 with respect to the host vehicle 310), a vehicle type of the front vehicle 320, and a difference between a measured relative distance between the host vehicle 310 and the front vehicle 320 and a target inter-vehicle distance set by the driver. For example, the vehicle 310 may determine that the first driving situation condition is satisfied when the relative speed of the front vehicle 320 in a specific region of interest (ROI) is equal to or less than a predetermined speed. In another example, when the vehicle type of the front vehicle 320 is not a special vehicle of which passing is impossible or prohibited or is not recommended, such as a school bus, an emergency vehicle, etc., the vehicle 310 may determine that the second driving situation condition is satisfied. Further, the vehicle 310 may determine that a third driving situation condition is satisfied when the difference between the measured relative distance of the host vehicle 310 with respect to the front vehicle 320 and the target inter-vehicle distance set by the driver is equal to or less than a predetermined reference.

Additionally, the vehicle 310 may receive the setting speed of the vehicle from the driver or operator or set by a manufacturer, and determine whether one or more of the plurality of driving situation conditions are satisfied by using the difference between the received setting speed and the actual driving speed of the vehicle. For example, the vehicle 310 may determine that a fourth driving situation condition is satisfied when the actual driving speed of the vehicle is lower than the setting speed set by the driver by a predetermined reference or more.

Additionally, the vehicle 310 may determine whether one or more conditions among the plurality of driving situation conditions are satisfied based on whether the measured relative distances and the relative speeds of the host vehicle 310 with respect to the side front vehicle 330 and/or the side rear vehicle 340 on the target lane satisfy predetermined references. For example, the vehicle 310 may determine that a fifth driving situation condition is satisfied when the measured relative distance of the host vehicle 310 with respect to the side front vehicle 330 and/or the side rear vehicle 340 is equal to or more than a predetermined distance.

Additionally, the vehicle 310 may determine whether the lane condition is satisfied based on the color and type of the lane between the driving lane and the target lane. For example, when the lane is a lane which is not any one of the predetermined types of lines, such as the solid line indicating that the lane change is not allowed, a yellow line indicating a centerline, or a blue line indicating a bus-only lane, it may be determined that the lane condition is satisfied.

Figure 4:
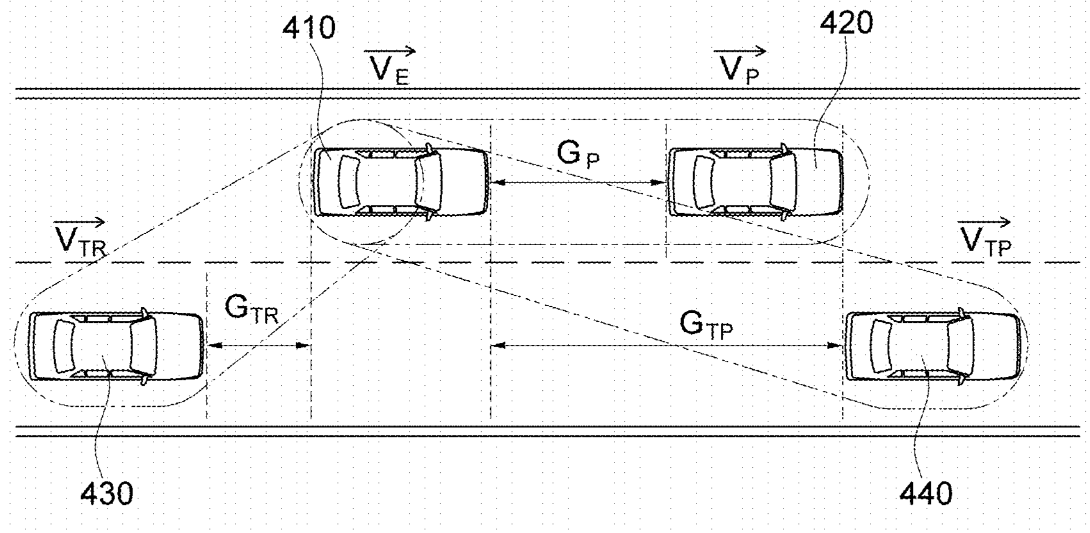
FIG. 4 is a conceptual diagram for illustrating an example of determining whether a vehicle satisfies a first lane change recommendation condition according to an exemplary embodiment of the present disclosure.

FIG. 4 is a conceptual diagram illustrating an example of determining whether the vehicle 410 satisfies a first lane change recommendation condition according to an exemplary embodiment of the present disclosure. As described above, the vehicle 410 (and/or a lane change recommendation system, such as the lane change recommendation system 100 of FIGS. 1 and 2, associated with the vehicle 410) may determine whether the vehicle 410 satisfies the first lane change recommendation condition by using the machine learning model learned to decide whether the vehicle can change a lane based on relevancies between the vehicle 410 and a front vehicle 420 on the driving lane of the vehicle 410, and a side rear vehicle 430 on the target lane and a side front vehicle 440 on the target lane. For example, the machine learning model may be a support vector machine (SVM) model learned to classify data in a possible situation of changing the lane and data in a possible situation of not changing the lane, but is not limited thereto, and any other classification of models may also be used.

According to an exemplary embodiment of the present disclosure, the machine learning model may be learned by using learning data including a measured relative distance between the host vehicle 410 and the front vehicle 420 on the driving lane of the host vehicle 410 at the time of changing the lane, a measured relative distance between the host vehicle 410 and the side rear vehicle 430 on the target lane, and a measured relative distance between the host vehicle 410 and the side front vehicle 440 on the target lane. That is, the machine learning model may be learned to acquire data regarding a measured relative distance of the host vehicle 410 with respect to a surrounding vehicle in real situations when a person driving the vehicle changes or does not change the lane, and classify data in the situation of changing the lane and in the situation of not changing the lane by using the acquired data.

According to an exemplary embodiment of the present disclosure, learning data may be pre-processed through filtering, etc. For example, when a measured relative distance between the host vehicle and a surrounding vehicle is excessively short in the lane change situation or the measured relative distance between the host vehicle and the surrounding vehicle is excessively long in the situation of not changing the lane, ideal value data may be filtered in the learning data. Further, the machine learning model may be learned based on the filtered learning data.

According to an exemplary embodiment of the present disclosure, the vehicle 410 may acquire information on measured relative distances of the host vehicle 410 with respect to surrounding vehicles 420, 430, and 440. The acquired information on the measured relative distances may be provided to the learned machine learning model. The machine learning model may classify whether the measured relative distances between the host vehicle 410 and the surrounding vehicles 420, 430, and 440 are in the situation in which the lane change is possible. Then, the vehicle 410 may determine whether the vehicle 410 satisfies the first lane change recommendation condition based on a classified result of the machine learning model.

In the embodiment related to FIG. 4 described above, it is determined whether the first lane change recommendation condition is satisfied by using the measured relative distances between the vehicle 410 and the surrounding vehicles 420, 430, and 440, but the present disclosure is not limited thereto. For example, it may also be determined whether the first lane change recommendation condition is satisfied by using the relative speed between the host vehicle 410 and the surrounding vehicles 420, 430, and 440. By such a configuration, the vehicle 410 may recommend the lane change only in an environment similar to an environment in which the person actually performs the lane change to reduce an accident possibility according to the lane change, and perform stable and safe lane change recommendation.

Figure 5:
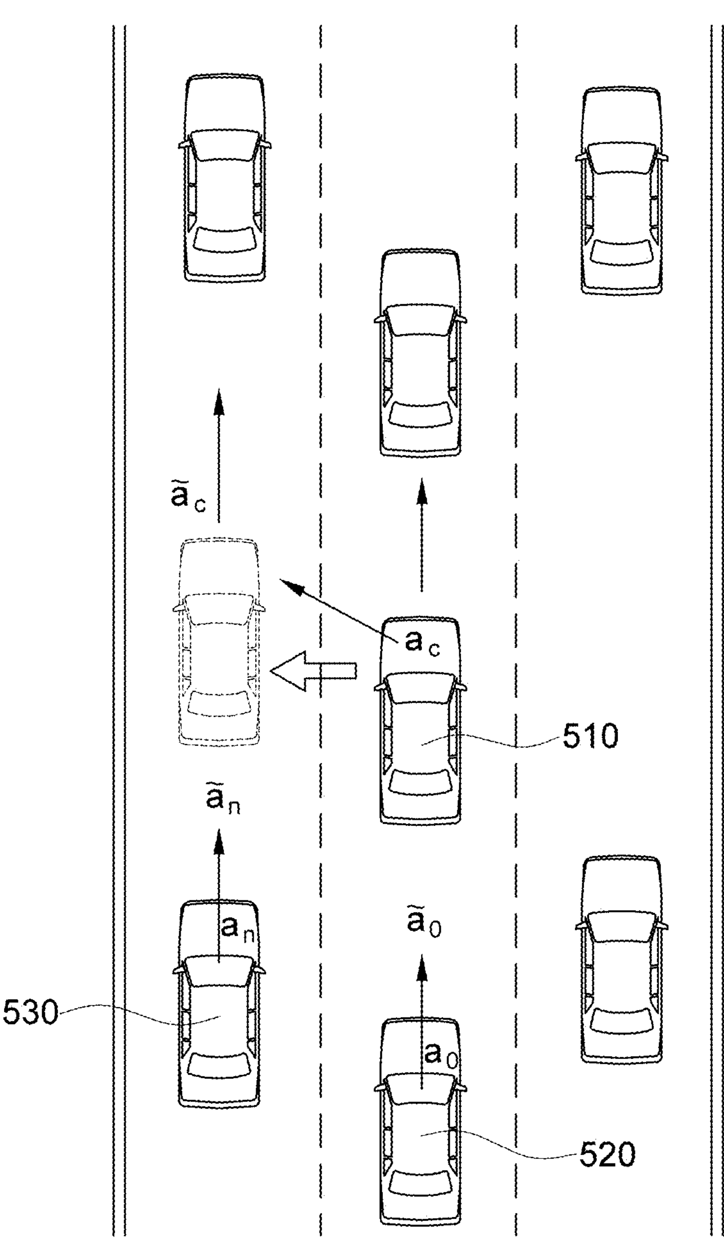
FIG. 5 is a conceptual diagram for illustrating an example of determining whether a vehicle satisfies a second lane change recommendation condition according to an exemplary embodiment of the present disclosure.

FIG. 5 is a conceptual diagram for illustrating an example of determining whether the vehicle 510 satisfies a second lane change recommendation condition according to an exemplary embodiment of the present disclosure. As described above, the vehicle 510 (and/or a lane change recommendation system, such as the lane change recommendation system 100 of FIGS. 1 and 2, associated with the vehicle 510) may calculate an acceleration gain value between the host vehicle 510, a rear vehicle 520 on the driving lane of the host vehicle 510, and a side rear vehicle 530 on the target lane, and determine whether the host vehicle 510 satisfies the second lane change recommendation condition based on whether the calculated acceleration gain value is equal to or greater than a predetermined threshold value.

In general, when the vehicle 510 changes the lane from an existing lane to a changed lane, an acceleration of the rear vehicle 520 behind the vehicle 510 on the existing lane may be increased, and an acceleration of the side rear vehicle 530 on the changed lane may be decreased. Further, the acceleration of the vehicle 510 which changes the lane may be increased. According to an exemplary embodiment of the present disclosure, the vehicle 510 may calculate an acceleration variation of three vehicles influenced by the lane change in order to optimize a traffic flow, and determine whether the acceleration gain value is equal to or greater than the predetermined threshold value. For example, the acceleration gain value may be calculated by Equation 1 below.

$$\tilde{a}_c - a_c + p[(\tilde{a}_n - a_n) + (\tilde{a}_o - a_o)] \quad \text{[Equation 1]}$$

where $a_c$ represents a previous acceleration of the host vehicle 510, $a_n$ represents a previous acceleration of the side rear vehicle 530, and $a_o$ represents a previous acceleration of the rear vehicle 520. Further, $\tilde{a}_c$ represents an acceleration of the vehicle 510 after the lane change, $\tilde{a}_n$ represents an acceleration of the side rear vehicle 530 after the lane change, and $\tilde{a}_o$ represents an acceleration of the rear vehicle 520 after the lane change. p may be a factor indicating how the acceleration gain values of other vehicles (e.g., the rear vehicle 520 and the side rear vehicle 530) are to be reflected. p may be set to be a value between 0 and 1.

That is, when acceleration gain values of three vehicles are equal to or greater than a predetermined threshold value, the vehicle 510 determines that the gain is generated in the traffic flow when changing the lane to determine that the second lane change recommendation condition is satisfied. By such a configuration, the vehicle 510 may recommend the lane change by comprehensively considering the overall traffic flow of the road in addition to a physical lane change possibility, and as a result, there is an advantage in that the gain may be obtained in the traffic flow.

Figure 6:
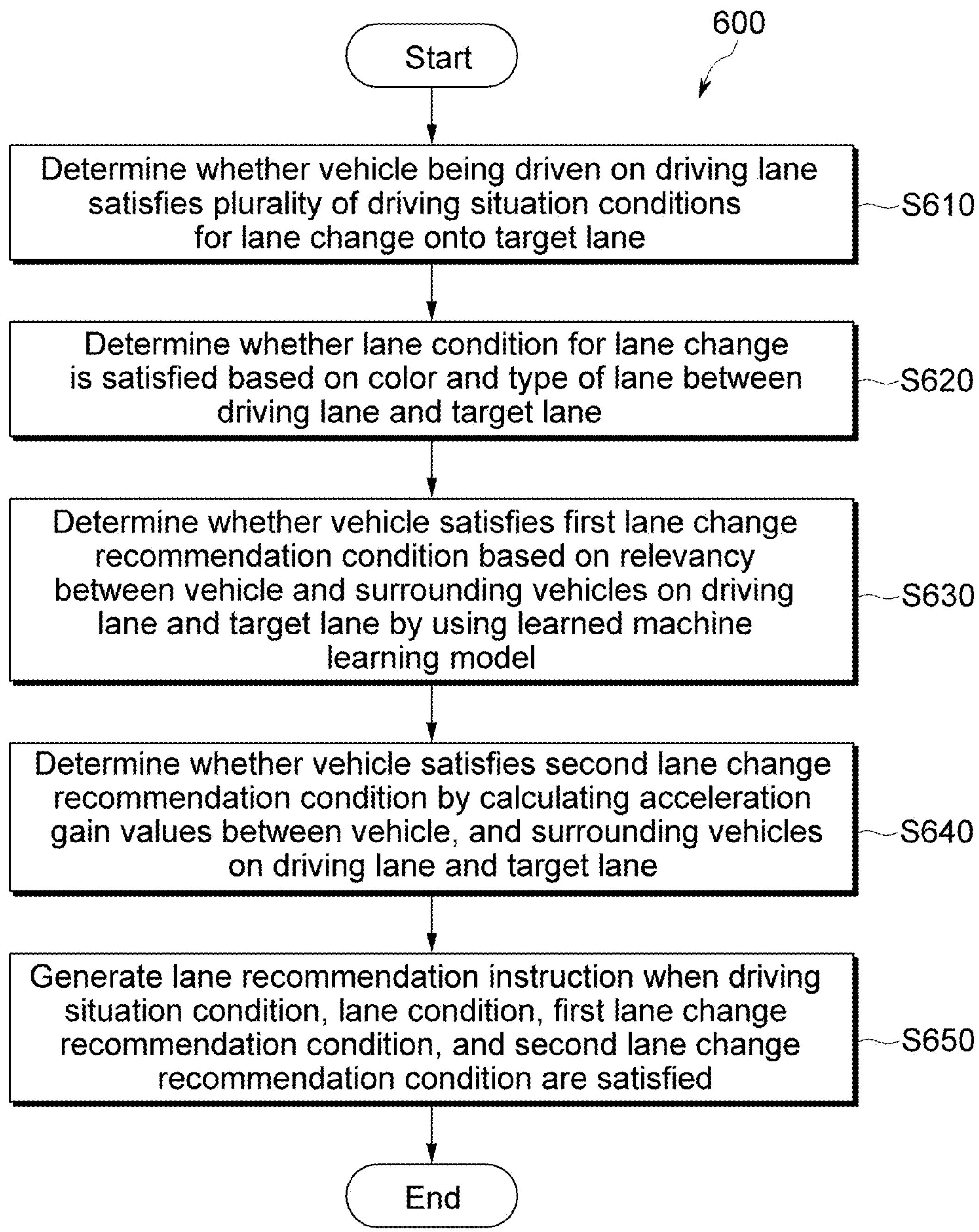
FIG. 6 is a flowchart for showing a lane change recommendation method according to an exemplary embodiment of the present disclosure.

FIG. 6 is a flowchart for showing a lane change recommendation method 600 according to an exemplary embodiment of the present disclosure. The lane change recommendation method 600 may be performed by at least one processor (e.g., at least one processor of the lane change recommendation system 100 and/or a processor 720 of FIG. 7). The lane change recommendation method 600 may be initiated by the processor by determining whether a host vehicle being driven on the driving lane satisfies the plurality of driving situation conditions for lane change from the driving lane into the target lane (operation S610).

The processor may determine whether one or more conditions among a plurality of driving situation conditions are satisfied by using one or more of a relative speed of a front vehicle on the driving lane with respect to the host vehicle (or a relative speed of the host vehicle with respect to the front vehicle), a vehicle type of the front vehicle, and a difference between a measured relative distance between the host vehicle and the front vehicle and an target inter-vehicle distance set by the driver. Further, the processor may determine whether one or more conditions among the plurality of driving situation conditions are satisfied by using one or more of a measured relative distance between the host vehicle and a side front vehicle on a target lane and a measured relative distance between the host vehicle and a side rear vehicle on the target lane. Additionally, the processor may determine whether one or more conditions of the plurality of driving situation conditions are satisfied by using a difference between a setting speed set by a driver or operator or a manufacturer and an actual driving speed of the vehicle.

The processor may determine whether a lane condition for lane change is satisfied based on a color and type of a lane between the driving lane and the target lane (operation S620).

The processor may determine whether the host vehicle satisfies a first lane change recommendation condition based on a relevancy between the host vehicle and surrounding vehicles on the driving lane and the target lane by using the learned machine learning model (operation S630). Here, the machine learning model may be, for example, but not be limited to, a support vector machine (SVM) model learned to classify data of a possible situation of changing the lane and data in a possible situation of not changing the lane.

The processor may determine whether the vehicle satisfies a second lane change recommendation condition by calculating acceleration gain values between the host vehicle and the surrounding vehicles on the driving lane and the target lane (operation S640). For example, the processor may determine whether the vehicle satisfies the second lane change recommendation condition based on whether the calculated acceleration gain values are equal to or greater than a predetermined threshold value. Here, the processor may calculate the acceleration gain value by using a predetermined minimizing overall braking induced by lane changes (MOBIL) algorithm, but is not limited thereto.

The processor may generate a lane recommendation instruction or an instruction for lane recommendation when the driving situation condition, the lane condition, the first lane change recommendation condition, and the second lane change recommendation condition are satisfied (operation S650). Additionally or alternatively, when the driving lane of the host vehicle after the lane change is the passing lane, the processor may determine whether a lane return condition is satisfied based on speeds of other vehicles being driven on the passing lane. For example, when an average speed of the other vehicles being driven on the passing lane is equal to or less than a predetermined speed (e.g., 80 kph), the host vehicle may be continuously driven on the passing lane, and the processor may not generate an instruction for the lane return.

According to an exemplary embodiment of the present disclosure, in response to determining that the vehicle is unable to be driven at a speed around the setting speed of the driver, the processor may determine the driving situation condition, the lane condition, the first lane change recommendation condition, and the second lane change recommendation condition.

According to some embodiments of the present disclosure, the lane change recommendation system and method can achieve increased flexibility, faster processing times, and smaller computing resources for performing operations related to lane change in an autonomous vehicle or a vehicle with a driver assistance technology (such as an Advanced Driver-Assistance System (ADAS)) while securing the safety of the operations of the vehicle, by computerized instructions of considering one or more of the plurality of driving situation conditions for the lane change, the lane condition for the lane change, the first lane change recommendation condition, and the second lane change recommendation condition described above.

Figure 7:
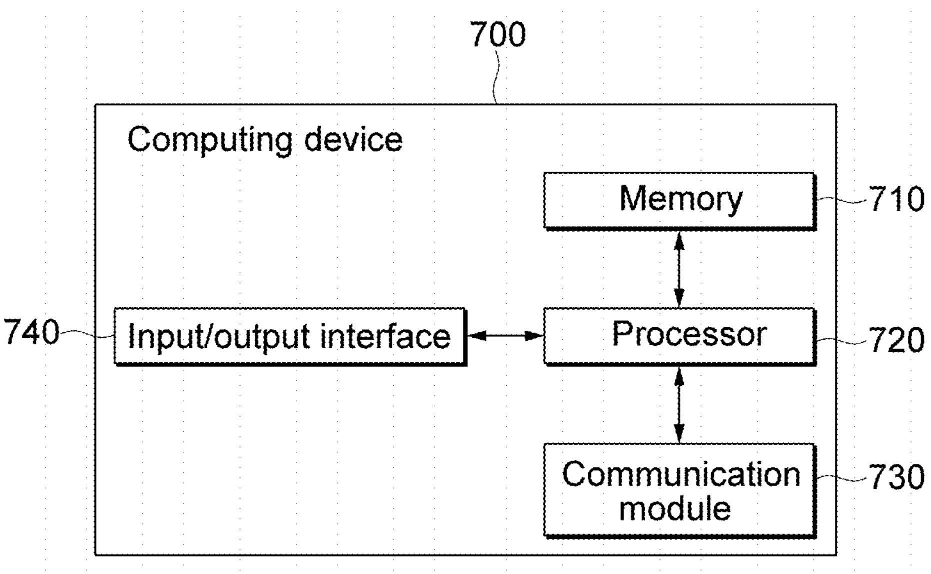
FIG. 7 is a block diagram for illustrating an internal configuration of a computing device according to an exemplary embodiment of the present disclosure.

FIG. 7 is a block diagram illustrating an internal configuration of a computing device (or a computer) 700 according to an exemplary embodiment of the present disclosure. According to an exemplary embodiment, the computing device 700 may include a memory 710, a processor 720, a communication module 730, and an input/output interface 740. The lane change recommendation system 100, the vehicle associated navigation map information module 120, the driving lane determination module 130, the driver switch input nit 140, the sensor fusion information input unit 150 may include the computing device 700, or the computing device 700 may comprise the lane change recommendation system 100, and the lane change recommendation method may be performed by one or more components included in the computing device 700. As illustrated in FIG. 7, the computing device 700 may be configured to communicate information, instructions, and/or data through a network by using the communication module 730.

The memory 710 may include a non-transitory arbitrary computer-readable recording medium. According to exemplary embodiments of the present disclosure, the memory 710 may include permanent mass storage devices such as a random access memory (RAM), a read only memory (ROM), a disk drive, a solid state drive (SSD), and a flash memory. As another example, the permanent mass storage device such as the ROM, the SSD, the flash memory, and the disk drive as a separate permanent storage device distinguished from the memory may be included in the computing device 700. Further, the memory 710 may store an operating system and program codes or instructions.

The software components may be loaded from a separate computer-readable recording medium apart from the memory 710. The separate computer-readable recording medium may include a recording medium directly connectable to the computing device 700, and may include, for example, a computer-readable recording medium such as a floppy drive, a disk, a tape, a DVD/CD-ROM drive, a memory card, etc. As another example, the software components may also be loaded to the memory 710 through the communication module 730 rather than the computer-readable recording medium. For example, at least one program may be loaded to the memory 710 based on a computer program installed by files which developers or a file distribution system distributing an installation file of an application provides through the communication module 730.

The processor 720 may be configured to perform basic arithmetic, logic, and input/output operations to process an instruction of the computer program. The instruction may be provided to a user terminal or other external devices or systems by the memory 710 or the communication module 730.

The communication module 730 may provide a component or a function for the user terminal and the computing device 700 to communicate with each other through the network, and the computing device 700 may provide a component or a function for communicating with an external device or system (e.g., a separate cloud system). As an example, a control signal, an instruction, data, etc., provided according to the control of the processor 720 of the computing device 700 may be transmitted to the user terminal and/or the external device or system through the communication module of the user terminal and/or the external device or system via the communication module 730 and the network.

Further, the input/output interface 740 of the computing device 700 may be means for interfacing with a device for an input or an output, which may be connected to the computing device 700 or which may include the computing device 700. In FIG. 7, the input/output interface 740 is illustrated as a component separately configured from the processor 720, but is not limited thereto, and the input/output interface 740 may be configured to be included in the processor 720. The computing device 700 may include additional components in addition to the components of FIG. 7. However, conventional technical components of the computing device 700 are omitted in FIG. 7.

The processor 720 of the computing device 700 may be configured to control, manage, process, and/or store information, instructions and/or data received from a plurality of user terminals and/or a plurality of external devices, systems.

The method and/or system according to various embodiments of the present disclosure may be implemented by a digital electronic circuit, computer hardware, firmware, software, and/or a combination thereof. Various exemplary embodiments of the present disclosure may be executed by a data processing device, e.g., one or more programmable processors and/or one or more computing devices or implemented by a computer readable recording medium and/or a computer program stored in the computer readable recording medium. The computer program may be created by a predetermined type of programming language including a compiled language or an interpreted language, and distributed as a predetermined type such as an independent execution type program, a module, a subroutine, etc. The computer program may be distributed through one the computing device, a plurality of computing devices connected through the same network, and/or a plurality of computing devices distributed to be connected through a plurality of different networks.

The method and/or system according to various embodiments of the present disclosure may be performed by one or more processors configured to operate based on the input data or execute one or more computer programs processing, storing, and/or managing a predetermined function, a predetermined function, etc., by generating the output data. For example, the method and/or system according to various exemplary embodiments of the present disclosure may be performed by a special-purpose logic circuit such as a field programmable gate array (FPGA) or application specific integrated circuit (ASIC), and an apparatus and/or a system for performing the method and/or exemplary embodiments of the present disclosure may be implemented as the special-purpose logic circuit such as the FPGA or ASIC.

One or more processor executing the computer program may include a universal-purpose or special-purpose microprocessor and/or one or more processors of a predetermined type of digital computing device. The processor may receive a command and/or data from each of a read dedicated memory and a random access memory or receive the command and/or data from the read dedicated memory and the random access memory. In the present disclosure, components of the computing device performing the method and/or exemplary embodiments may include one or more processors for executing instructions, and one or more memory devices for storing the instructions and/or data.

According to an exemplary embodiment of the present disclosure, the computing device may send and receive data to and from one or more mass storage devices for storing data. For example, the computing device may receive data from a magnetic disc or an optical disc or/and transmit the data to the magnetic disc or the optical disc. A computer readable recording medium suitable for storing the commands and/or data associated with the computer program may include a predetermined type of non-volatile memory including semiconductor memory devices such as an Erasable Programmable Read-Only Memory (EPROM)), an Electrically Erasable PROM (EEPROM), a flash memory device, etc., but the present disclosure is not limited thereto. For example, the computer readable storage medium may include a magnetic disc such as an internal hard disc or a mobile disc, a magneto-optic disc, a CD-ROM disc, and a DVD-ROM disc.

In order to provide an interaction with the user, the computing device may include a display device (e.g., a Cathode Ray Tube (CRT), a Liquid Crystal Display (LCD), etc.) for providing or displaying information to the user, and a pointing device (e.g., a keyboard, a mouse, a trackball, etc.) which enables the user to provide an input and/or a command onto the computing device, but the present disclosure is not limited thereto. That is, the computing device may further include other predetermined types of devices for providing the interaction with the user. For example, the computing device may provide, to the user, predetermined types of sense feedbacks including a visual feedback, an auditory feedback, and/or a tactile feedback for the interaction with the user. In this regard, the user may provide the input to the computing device through various gestures including visual, voice, behaviors, etc.

In the present disclosure, various exemplary embodiments may be implemented in a computing system including a backend component (e.g., a data server), a middleware component (e.g., an application server), and/or a frontend component. In this case, the components may be interconnected by a predetermined form or medium of digital data communications such as a communication network. For example, the communication network may be a (Local Area Network (LAN), a Wide Area Network (WAN), etc.

The computing device based on the exemplary embodiments described in the present specification may be implemented by using hardware and/or software configured to interact with the user, which includes a user device, a user interface (UI) device, a user terminal, or a client device. For example, the computing device may include a hand-held computing device such as a laptop computer. Additionally or alternatively, the computing device may include a Personal Digital Assistants (PDA), a tablet PC, a game console, a wearable device, an Internet of things (IoT) device, a virtual reality (VR) device, an augmented reality (AR) device, etc., but the present disclosure is not limited thereto. The computing device may further include another type of device configured to interact with the user. Further, the computing device may include a hand-held communication device (e.g., a mobile phone, a smart phone, a wireless cellular phone, etc.) suitable for wireless communication through a network such as a mobile communication network, etc. The computing device may be configured to wirelessly communicate with a network server by using wireless communication technologies and/or protocols such as radio frequency (RF), microwave frequency (MWF), and/or infrared ray frequency (IRF).

In the present disclosure, various exemplary embodiments including specific structural and functional details are exemplary. Thus, the exemplary embodiments of the present disclosure are not limited to the above and can be implemented in several different forms. In addition, the terms used in the present disclosure are intended to explain some exemplary embodiments and are not interpreted as limiting the exemplary embodiment. For example, a singular word and the above may include a plurality type as long as it is not clearly represented in context.

In the present disclosure, if it is not contrarily defined, all terms used in the present specification including technological or scientific terms have the same meanings as those generally understood by a person with ordinary skill in the art to which such a concept belongs. Further, generally used terms such as terms defined in a dictionary should be interpreted to have a meaning which coincides with a meaning in a context of related art.

In the present specification, the present disclosure is described in relation to some embodiments, but various modifications and changes can be made within the scope without departing from the scope of the present disclosure that can be understood by those skilled in the art in the present disclosure. Further, the modifications and the changes should be regarded to be included in the appended claims of the present specification.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A lane change recommendation system comprising:

one or more processors; and memory configured to store instructions that, when executed by the one or more processors, cause the one or more processors to perform operations that include:

determining whether a host vehicle being driven on a driving lane satisfies a plurality of driving situation conditions for lane change from the driving lane into a target lane;

determining whether a lane condition for the lane change from the driving lane into the target is satisfied based on a color and type of a lane between the driving lane and the target lane;

determining whether the host vehicle satisfies a second lane change recommendation condition based on acceleration gain values between the host vehicle and surrounding vehicles on the driving lane and the target lane, wherein the acceleration gain values are calculated by using a predetermined algorithm for minimizing overall braking induced by lane changes;

generating an instruction of lane recommendation in response to determination of whether the plurality of driving situation conditions for the lane change, the lane condition for the lane change, and the second lane change recommendation condition are satisfied; and determining whether a condition for lane return is satisfied based on speeds of other vehicles being driven on a passing lane when the host vehicle is on the passing lane after the lane change, wherein the one or more processors are configured to generate an instruction for the lane return when the speeds of the other vehicles being driven on the passing lane are equal to or greater than a predetermined speed.

2. The system of claim 1, wherein the one or more processors are configured to determine whether one or more of the plurality of driving situation conditions are satisfied based on one or more of a relative speed between the host vehicle and a front vehicle on the driving lane, a vehicle type of the front vehicle, and a difference between a relative distance between the host vehicle and the front vehicle and an inter-vehicle distance.

3. The system of claim 1, wherein the one or more processors are configured to determine whether one or more of the plurality of driving situation conditions are satisfied based on one or more of a relative distance between the host vehicle and a side front vehicle on the target lane and a relative distance between the host vehicle and a side rear vehicle on the target lane.

4. The system of claim 1, wherein the one or more processors are configured to:

receive a setting speed input by a driver or an operator, and determine whether one or more conditions of the plurality of driving situation conditions are satisfied based on a difference between the setting speed input by the driver or operator and an actual driving speed of the host vehicle.

5. The system of claim 1, wherein the one or more processors are configured to determine whether the host vehicle satisfies a first lane change recommendation condition based on a relevancy between the host vehicle and surrounding vehicles on the driving lane and the target lane by using a learned machine learning model.

6. The system of claim 5, wherein the machine learning model comprises a support vector machine (SVM) model learned to classify data associated with a situation of changing a lane and data associated with a situation of not changing the lane.

7. The system of claim 1, wherein whether the host vehicle satisfies the second lane change recommendation condition is determined based on whether the acceleration gain values are equal to or greater than one or more predetermined threshold values.

8. The system of claim 1, wherein the plurality of driving situation conditions for the lane change from the driving lane into the target lane comprises a condition of whether the vehicle is unable to be driven at a speed around a setting speed input by a driver or operator.

9. A lane change recommendation method performed by at least one processor, the method comprising:

determining whether a host vehicle being driven on a driving lane satisfies a plurality of driving situation conditions for lane change from the driving lane into a target lane;

determining whether a lane condition for lane change is satisfied based on a color and type of a lane between the driving lane and the target lane;

determining whether the host vehicle satisfies a first lane change recommendation condition based on a relevancy between the host vehicle and surrounding vehicles on the driving lane and the target lane by using a learned machine learning model;

determining whether the host vehicle satisfies a second lane change recommendation condition based on acceleration gain values between the host vehicle and the surrounding vehicles on the driving lane and the target lane, wherein the acceleration gain values are calculated by using a predetermined algorithm for minimizing overall braking induced by lane changes;

generating an instruction of lane recommendation when the plurality of driving situation conditions for the lane change, the lane condition for the lane change, the first lane change recommendation condition, and the second lane change recommendation condition are satisfied; and when the host vehicle is on a passing lane after the lane change, determining whether a condition for lane return is satisfied based on speeds of other vehicles being driven on the passing lane, wherein the method further comprises generating an instruction for the lane return when the speeds of the other vehicles being driven on the passing lane are equal to or greater than a predetermined speed.

10. The method of claim 9, further comprising, in response to determining that the host vehicle is unable to be driven at a speed around a setting speed set by a driver or an operator, determining the plurality of driving situation conditions for the lane change, the lane condition for the lane change, the first lane change recommendation condition, and the second lane change recommendation condition.

11. A non-transitory computer-readable recording medium storing instructions for execution by one or more processors that, when executed by the one or more processors, cause the one or more processors to:

determine whether a host vehicle being driven on a driving lane satisfies a plurality of driving situation conditions for lane change from the driving lane into a target lane;

determine whether a lane condition for the lane change from the driving lane into the target is satisfied based on a color and type of a lane between the driving lane and the target lane;

determine whether the host vehicle satisfies a second lane change recommendation condition based on acceleration gain values between the host vehicle and surrounding vehicles on the driving lane and the target lane, wherein the acceleration gain values are calculated by using a predetermined algorithm for minimizing overall braking induced by lane changes;

generate an instruction of lane recommendation in response to determination of whether the plurality of driving situation conditions for the lane change, and the lane condition for the lane change, and the second lane change recommendation condition are satisfied; and determine whether a condition for lane return is satisfied based on speeds of other vehicles being driven on a passing lane when the host vehicle is on the passing lane after the lane change, wherein the one or more processors are further configured to generate an instruction for the lane return when the speeds of the other vehicles being driven on the passing lane are equal to or greater than a predetermined speed.

* * * * *